United States Patent [19]

Sackmann et al.

[11] 3,876,588

[45] Apr. 8, 1975

[54] CYCLO COPOLYMERS

[75] Inventors: Gunter Sackmann, Leverkusen; Gunter Kolb, Cologne-Stammheim, both of Germany

[73] Assignee: Bayer Aktiengesellschaft, Leverkusen, Germany

[22] Filed: Jan. 11, 1973

[21] Appl. No.: 322,709

Related U.S. Application Data

[63] Continuation-in-part of Ser. No. 176,390, Aug. 18, 1971, abandoned.

[52] U.S. Cl............ 260/78.5 R; 117/122; 117/161; 260/47 UA; 260/78.3 UA; 260/79.3 MU; 260/80 NC; 260/80.3 N; 260/80.7; 260/80.72; 260/80.73; 260/80.75; 260/80.76; 424/71

[51] Int. Cl........................ C08f 15/02; C08f 15/40

[58] Field of Search.... 260/78.3 UA, 78.5 R, 80.73, 260/80.75, 80.7, 80.76

[56] References Cited
UNITED STATES PATENTS
2,995,535   8/1961   Gethins............................. 260/23.5

OTHER PUBLICATIONS
Chem. Abst., 67, 44912m.

*Primary Examiner*—Christopher A. Henderson
*Attorney, Agent, or Firm*—Connolly and Hutz

[57] ABSTRACT

The invention relates to a process for the production of cyclocopolymers, characterised in that compounds of the general formula 1

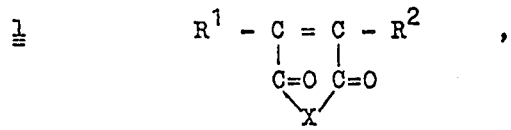

in which $R^1$ and $R^2$ may be identical or different and mean H, $CH_3$, Cl or Br; and X means $$-O-\quad -\underset{R}{N}-$$

where R means hydrogen, an aliphatic or aromatic radical, are copolymerised with unsaturated compounds of the general formula 2

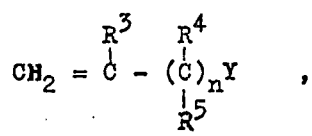

in which $n$ is 1 – 4; $R^3$ is H, $CH_3$ or $-CH_2-CH$; Y is OH or $NH_2$; and $R^4$ and $R^5$ may be identical or different and mean hydrogen or ($C_1$–$C_4$)-alkyl,
preferably in equimolar amounts, and possibly with the use of further unsaturated compounds which are copolymerisable with compounds of the formula 1 and to copolymers obtainable by the process of the invention.

1 Claim, No Drawings

CYCLO COPOLYMERS

CROSS REFERENCE TO RELATED APPLICATION

This application is a continuation-in-part of now abandoned Ser. No. 176,390 as filed Aug. 18, 1971.

It is known to radical-polymerise unsaturated carboxylic acid anhydrides. With the use of large amounts of catalyst, the homopolymerisation of unsaturated carboxylic acid anhydrides yields only polymers of a comparatively low molecular weight. (cf R. W. Lenz, Organic Chemistry of Synthetic High Polymers, Interscience Publishers N.Y., 1967, page 389).

If, on the other hand, the radical polymerisation of allyl compounds, such as e.g. allyl alcohol, is attempted, virtually no polymeric substance is obtained (cf U.S. Pat. No. 2,541,155).

Surprisingly, it has now been found that unsaturated cyclic compounds of the general formula 1

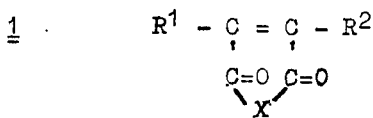

in which $R^1$ and $R^2$ may be identical or different and mean H, $CH_3$, Cl or Br, and X means

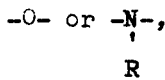

where R is hydrogen, an aliphatic or aromatic radical, can be copolymerised with unsaturated compounds of the general formula 2

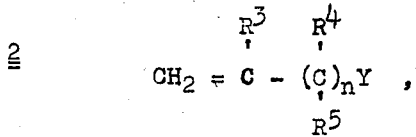

in which $n$ means 1 – 4; $R^3$ is H, $CH_3$ or $-CH_2-OH$; Y is OH or $NH_2$; and $R^4$ and $R^5$ may be identical or different and mean hydrogen, or $(C_1-C_4)$-alkyl, optionally in the presence of further unsaturated compounds which are copolymerisable with compounds of the formula 1, to form high-molecular cyclo copolymers.

The subject-matter of the present invention therefore comprises a process for the production of cyclo copolymers, which is characterised in that compounds of the general formula 1 are copolymerised with unsaturated compounds of the general formula 2, preferably in equimolar amounts, and optionally with the use of further unsaturated compounds which are copolymerisable with compounds of the formula 1.

The unsaturated compounds of the general formula 1 comprise, for example, maleic acid anhydride, monochloro-, dichloro-, monobromo- and dibromo-maleic acid anhydride, maleic acid-imide, maleic acid N-methyl- and -N-phenyl-imide and citraconic acid anhydride.

Compounds of the general formula 2 are, for example, allyl alcohol, methallyl alcohol, allylamine, methallylamine, 2-methylene-propane-diol-1,3, 1-buten-4-ol, 1-penten-5-ol and 1,1-dimethyl-allyl alcohol.

Examples of further unsaturated compounds which are copolymerisable with compounds of the formula 1 are allyl compounds and methallyl compounds of the general formula 3

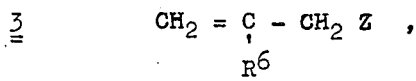

in which $R^6$ is hydrogen or methyl; Z is halogen, isocyanato, $OCOR^7$ or $OR^7$ where $R^7$ means the radical of an aliphatic, cycloaliphatic or aromatic hydrocarbon with 1 to 18 preferably 1 to 8 carbon atoms.

In particular, the following allyl compounds may be mentioned by way of example: cyclic acroleinacetale, allyl chloride, 2-chloropropene, allyl acetate, allyl octeate, allyl cyanide, allyl isocyanate, allyl methyl ether, allyl butyl ether, allyl phenyl ether, allyl cyclohexyl ether.

The corresponding methallyl compounds are also suitable.

Monomers which impart self-cross-linking properties to the cyclo copolymers, such as N-methoxymethyl-allyl-urethane, may also be used.

Moreover, the following unsaturated compounds which are copolymerisable with compounds of the formula 1 are suitable: vinyl compounds, e.g., unsaturated ethers such as vinyl methyl ether, vinyl butyl ether, isopropenyl ethyl ether; unsaturated esters, such as vinyl acetate or 1,3-diacetoxy-2-methylene-propane, vinyl aromatic compounds, such as e.g., styrene, $\alpha$-methylstyrene, p-chlorostyrene or p-methoxystyrene; divinyl compounds, such as e.g., divinyl ether and divinylsulphone; vinylidene compounds, such as e.g., vinylidene chloride and vinylidene fluoride.

In addition, mono- and polyolefines, such as ethylene, propylene, 1-butene, 2-butene, isobutylene, diisobutylene, triisobutylene, tetraisobutylene, cyclopentene, cyclohexene, butadiene and isoprene are also suitable as further unsaturated compounds which are copolymerisable with compounds of the formula 1.

In the process according to the invention, the compounds of the formula 1 as well as those of the formula 2 and the unsaturated compounds which are copolymerisable with compounds of the general formula 1 and are mentioned above, can be used individually or in combination with each other.

The polymerisation can be carried out in bulk, with the use of a solvent which is inert towards the reaction components, in a non-aqueous emulsion or suspension, or also as precipitation polymerisation. Polymerisation in inert solvents, such as dioxane, tetrahydrofuran, acetone and methyl ethyl ketone, aromatic hydrocarbons, such as benzene, toluene and xylene, and ethyl acetate, is preferred.

The polymerisation temperature depends on the catalyst system used. It preferably ranges from 20°C to 200°C.

The polymerisation can be initiated by heating, by illumination with actinic light or by the addition of radical-forming substances, such as e.g. peroxides, hydroperoxides, $H_2O_2$, percarbonates, perborates, peracetic acid or peracetates, persulphates, azo compounds such as azobisisobutyronitrile, as well as redox catalysts.

The usual regulators for influencing the molecular weight may be added to the polymerisation for influencing the molecular weight, such as long-chain alkyl mercaptans, diisopropylxanthogen disulphide, nitro compounds and similar compounds.

The compounds of the general formulae 1 and 2 are preferably used in equimolar amounts for the cyclo copolymerisation. If, in addition, there are used the aforesaid further unsaturated compounds which are copolymerisable with compounds of the formula 1, the amounts of the latter have to be such that the sum total of these compounds and of those of the general formula 2 is equimolar to the sum total of the compounds of the general formula 1. The preferred reaction moreover is carried out by using 25 Mol-percent of the compounds of the general formula 2 wherein $R^3$ is H or $CH_3$, Y is OH, $R^4$ and $R^5$ is H and $n$ is 1, 25 Mol-percent of the aforesaid further unsaturated compounds being copolymerisable with compounds of the formula 1 and having molecular weights less than 219, and 50 Mol-percent of the sum total of the compounds of the general formula 1 wherein X means —O—.

A process which is formally similar to the claimed process and which is disclosed in the U.S. Pat. No. 3 511 820, is using 2-phenyl-substituted allyl alcohol and allyl alcohol derivatives. But owing to the phenyl substituents of the allyl components, this process is not comparable with the process of the present invention; therefore the copolymers obtainable by this process have a high degree of insolubility in organic solvents (see U.S. Pat. No. 3,511,820, column 4 lines 51/56) which the products of the present invention do not have.

When, for example, maleic acid anhydride, on the one hand, and e.g., allyl or methallyl alcohol, on the other hand, are used, the claimed process, surprisingly, leads to high-molecular cyclo copolymers which are soluble because they are not cross-linked.

As can be seen from the spectroscopic findings which indicate the presence of carboxyl and lactone groups and the absence of C=C double bonds and cyclic carboxylic acid anhydride groupings, it is highly probable that the copolymer of maleic acid anhydride and allyl alcohol contains the following recurrent structural unit of the formula 4:

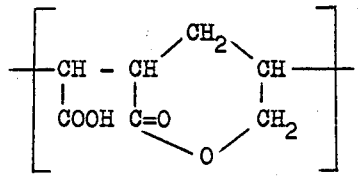

4

It follows that the copolymerisation proceeds as an intramolecular cyclo copolymerisation, i.e., with simultaneous or consecutive ring opening and ring closure reactions.

This transcyclisation between compounds of the formulae 1 and 2, which proceeds before or after the copolymerisation or synchronously with the latter and, presumably, like other lactone formations or ester formations (cf. E. Muller, Neuere Anschauungen der Organischen Chemie, Springer-Verlag 1957, pages 175 and 264–267), according to an ionic mechanism, fails to occur to the extent to which the aforesaid unsaturated compounds which are copolymerisable with compounds of the formula 1 are used, as replacement for part of the compounds of the formula 2.

The subject-matter of the invention therefore also comprises cyclocopolymers which preferably have average molecular weights of 5000 to 100,000 and consist, at least partially, preferably at least 50 percent, referred to the sum of the equivalents in the polymer chain derived from the corresponding unsaturated cyclic compounds of the general formula 1, of structural units of the formula 5

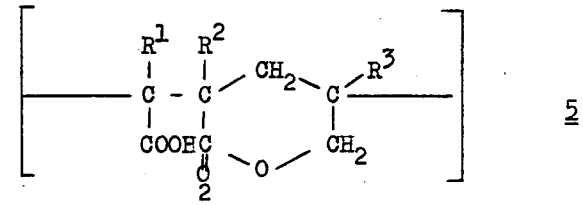

5 in which $R^1$ and $R^2$ may be identical or different and mean hydrogen, methyl or halogen, preferably chlorine and/or bromine, and $R^3$ is hydrogen or methyl.

The products obtained by the preferred reaction of 50 Mol-percent of compounds of the formula 1 wherein X means —O—, 25 Mol-percent of at least one compound of formula 2 wherein $R^3$ is H or $CH_3$, Y is OH, $R^4$ and $R^5$ is H and n is 1, and 25 Mol-percent of at least one of the aforesaid further unsaturated compounds being copolymerisable with the compounds of the formula 1 and having molecular weights less than 219, are characterized by having 50 percent, referred to the sum of the equivalents in the polymer chain derived from the corresponding unsaturated cyclic compounds of the general formula 1, cyclic lactone structures of the type of formula 5.

The copolymers of the present invention are therefore quite different from the terpolymers disclosed in the U.S. Pat. No. 2 995 535 which have reactive hydroxyl groups as well as carboxylic groups, the former of which are particularly esterified with fatty acids. Moreover, the molar ratio of the amounts of the copolymerisable monomers is quite different from that of the instant process; in the copolymerisation process disclosed in the U.S. Pat. No. 2 995 535 the sum of the amounts of the allyl alcohol compounds and of the vinyl monomers (styrene) is not equimolar to the amount of the copolymerisable dibasic unsaturated acids or acid derivatives.

These new cyclocopolymers prepared according to the invention can be dissolved in numerous organic solvents, such as e.g., acetone, tetrahydrofuran, dimethyl formamide, dimethyl sulphoxide, to a satisfactory extent, i.e., to give an at least 10 percent by weight solution, and they can also be made water-soluble by salt formation.

The new compounds are products with interesting properties which are due to the carboxyl groups, on the one hand, and to the lactone rings, on the other hand. The carboxyl groups impart to the cyclo copolymers according to the invention a strong polarity giving these compounds access to important technical fields of application. By neutralising the carboxyl groups with organic or inorganic bases, there are obtained water-soluble high-molecular compounds with an unusually wide spectrum of application. Obviously, it is possible to branch or cross-link the cyclo copolymers by reacting the carboxyl groups with the conventional bi- or polyfunctional compounds, such as diamines, polyamines, polyepoxides, polyisocyanates etc. The lactone rings impart to the cyclo copolymers outstanding solubility and an excellent compatibility with numerous natural and synthetic materials.

The said properties may be varied in almost any way by grafting other radical-polymerisable monomers on to the cyclo copolymers according to the invention by known methods, preferably in the presence of radical formers.

On account of these very interesting properties, the cyclo copolymers have a very wide spectrum of application. By way of example, there may be mentioned the use as varnish, adhesive, coating agent for various substrates such as wood, paper, metal, leather, synthetic plastics, impregnating agent, textile auxiliary, finishing or plasticising agent, protective colloid and emulsifier, thickening agent, coupling agent, moulded articles, foam or also as film or foil, as agent for improving the soil structure, as hair setting agent, as electrophoretically applicable primers or varnishes, for the preparation of pigment dispersions and of microporous foil material, and as polishing agent for synthetic floor coverings. Moreover the products of the instant invention have excellent adhesiveness to different supports, especially metals, e.g. copper, and are therefore useful as photo laquers.

EXAMPLES 1 – 20

Equimolar amounts of the starting monomers and the initiator, in amounts of 0.02 – 10.0 percent by weight are dissolved in the solvent concerned, and the resultant solution is transferred to reaction vessels which have been heated and rinsed with nitrogen. These are tightly sealed under nitrogen and heated to the required temperature. When the polymerisation is completed, the polymer can be precipitated by adding the resultant viscous solutions dropwise to an excess of ether or low-boiling petroleum ether. The precipitated white powdery polymers are subsequently dried in a vacuum drier at 60°C until the weight remains constant.

| Example | Starting monomer | Initiator | Solvent | Temperature | Yield | $[\eta]$ dl/g |
|---|---|---|---|---|---|---|
| 1 | maleic acid-anhydride (MA) + allyl alcohol | AJBN | dioxane | 70°C | — | 0.315 |
| 2 | MA + allyl alcohol | AJBN | benzene | 70°C | — | — |
| 3 | MA + allyl alcohol | AJBN | dioxane | 60°C | almost quantitative | — |
| 4 | '' | cyclohexyl percarbonate | tetrahydrofuran | 30°C | — | — |
| 5 | '' | '' | acetone | 30°C | 55.0% | — |
| 6 | '' | cyclohexyl-percarbonate/p-dimethyl-toluidine | acetone | 15°C | — | — |
| 7 | MA + methallyl alcohol | AJBN | dioxane | 70°C | 100.0% | — |
| 8 | '' | AJBN | acetone | 55°C | 90.5% | — |
| 9 | '' | cyclohexyl percarbonate | acetone | 30°C | 100.0% | — |
| 10 | '' | AJBN | dioxan | 70°C | 100.0% | 0.228 |
| 11 | '' | lauroyl peroxide/p-dimethyl-toluidine | acetone | 15°C | — | — |
| 12 | '' | cyclohexyl percarbonate/p-dimethyl-toluidine | acetone | 15°C | — | — |
| 13 | '' | AJBN | dioxan | 70°C | 96.5% | 0.241 |
| 14 | '' | AJBN | dioxan | 70°C | 100.0% | — |
| 15 | MA + 2-methylene propane diol-1,3 | AJBN | dioxan | 70°C | 66.5% | — |
| 16 | '' | AJBN | dioxan | 60°C | — | — |
| 17 | '' | AJBN | DMF | 60°C | — | — |
| 18 | '' | cyclohexyl percarbonate | acetone | 30°C | 63.7% | — |
| 19 | MA + 1-buten-4-ol | AJBN | dioxane | 70°C | 72.1% | — |
| 20 | MA + isoprene alcohol | AJBN | dioxane | 70°C | — | — |

AJBN = Azobisisobutyronitrile
isoprene alcohol = 3-hydroxy-3-methyl-buten-1

EXAMPLES 21 – 28

Equimolar amounts of maleic acid anhydride and the copolymerisation components are intimately mixed by stirring in an autoclave, and the stated amount of initiator is then added. The mixture is heated to polymerisation temperature under nitrogen. When the polymerisation is completed, the autoclave is opened and the product obtained dissolved in a solvent. The polymers are then precipitated in the form of colourless powders by adding these solutions dropwise to an excess of ether or petroleum ether; they are then dried in a vacuum at 60°C until the weight remains constant.

| Example | Starting monomer | Initiator | Solvent | Temp. |
|---|---|---|---|---|
| 21 | MA + allyl amine | AJBN | — | 120°C |
| 22 | MA + allyl alcohol | AJBN | — | 60°C |
| 23 | MA + allyl alcohol | AJBN | — | 60°C |
| 24 | MA + methallyl alcohol | AJBN | — | 60°C |
| 25 | " | AJBN | — | 60°C |
| 26 | MA + 2-methylene-propane diol-1,3 | AJBN | — | 70°C |
| 27 | MA + 1-buten-4-ol | AJBN | — | 60°C |
| 28 | MA + isoprene alcohol | AJBN | — | 70°C |

The yields range from 20 to 98%

EXAMPLES 29 – 46

In each case, maleic acid anhydride and two copolymerisation components are dissolved in a solvent together with the initiator. The amount of the two comonomers is chosen in such a way that their sum total is equivalent to the amount of maleic acid anhydride. This solution is introduced into a dry four-neck flask which is fitted with stirrer, reflux condenser, internal thermometer as well as with inlet and outlet for nitrogen and which has been rinsed with nitrogen, and it is stirred at the reaction temperature until the polymerisation is completed. The resultant product is then added dropwise to an excess of ether or low-boiling petroleum ether whereupon the polymer is precipitated in the form of a colourless powder. This is filtered off and dried in a vacuum at 60°C for 48 hours.

| Example | Starting monomer | Initiator | Solvent | Temperature | Conversion | $[\eta]$ dl/g |
|---|---|---|---|---|---|---|
| 29 | MA + allyl alcohol allyl acetate | AJBN | dioxane | 70°C | 95.0% | — |
| 30 | MA + allyl alcohol allyl chloride | AJBN | dioxane | 70°C | — | — |
| 31 | MA + allyl alcohol allyl ethyl ether | AJBN | dioxane | 70°C | 86.5% | — |
| 32 | MA + allyl alcohol diisobutylene | AJBN | dioxane | 70°C | 56.1% | — |
| 33 | MA + allyl alcohol cyclopentene | AJBN | dioxane | 70°C | 81.3% | — |
| 34 | MA + allyl alcohol 1-butene | AJBN | dioxane | 70°C | — | — |
| 35 | MA + methallyl alcohol allyl acetate | AJBN | dioxane | 70°C | 89.2% | — |
| 36 | MA + methallyl alcohol allyl acetate | cyclohexyl percarbonate | acetone | 30°C | 81.0% | 0.288 |
| 37 | MA + methallyl alcohol methallyl acetate | AJBN | dioxane | 70°C | 100.0% | 0.181 |
| 38 | MA + methallyl alcohol allyl chloride | AJBN | dioxane | 70°C | 85.7% | — |
| 39 | MA + methallyl alcohol diisobutylene | AJBN | dioxane | 70°C | 95.7% | — |
| 40 | MA + methallyl alcohol cyclopentene | AJBN | dioxane | 70°C | 93.6% | — |
| 41 | MA + methallyl alcohol 1-butene | AJBN | dioxane | 70°C | 97.5% | 0.238 |
| 42 | MA + methallyl alcohol styrene | AJBN | dioxane | 70°C | — | 0.681 |
| 43 | MA + methallyl alcohol vinyl acetate | AJBN | dioxane | 70°C | — | 0.212 |
| 44 | MA + methallyl alcohol vinyl isobutyl ether | AJBN | dioxane | 70°C | — | — |
| 45 | MA + methylene-propane-diol-1,3 allyl alcohol | AJBN | dioxane | 70°C | 68.9% | — |
| 46 | MA + 2-methylene-propane-diol-1,3 1,3-diacetoxy-2-methylene-propane | AJBN | dioxane | 70°C | — | — |

EXAMPLE 47 – 51

Citraconic acid anhydride and the copolymerisation components are dissolved in equimolar amounts in the solvent, and the initiator is then added. The reaction mixture is transferred to pressure bottles which are tightly sealed under nitrogen. The reaction is then carried out at a constant temperature with continuous shaking in a roller cabinet. Finally, the resultant solution is stirred into an excess of ether, and the colourless precipitate is filtered off. It is then dried in a vacuum at 60°C for 48 hours.

The reactions without a solvent are carried out analogously. The reaction product is finally diluted with acetone and the polymer is precipitated by stirring the mixture into an excess of ether.

| Example | Starting monomer | Initiator | Solvent | Temp. |
|---|---|---|---|---|
| 47 | citraconic acid anhydride + allyl alcohol | AJBN | dioxane | 70°C |
| 48 | citraconic acid anhydride + methallyl alcohol | AJBN | dioxane | 70°C |
| 49 | citraconic acid anhydride + allyl alcohol | AJBN | — | 70°C |
| 50 | citraconic acid anhydride + methallyl alcohol | AJBN | — | 70°C |
| 51 | citraconic acid anhydride + allyl alcohol | AJBN | — | 100°C |

The yields are lower throughout than those obtained with the use of maleic acid anhydride.

We claim:

1. A polymer which is soluble in acetone, tetrahydrofuran, dimethylformamide and dimethylsulphoxide to an extent yielding a solution containing 10 percent by weight or more of said polymer and which is water-soluble in the form of its salt, said polymer having an average molecular weight of 5,000 to 100,000 and having a lactone structure of the formula

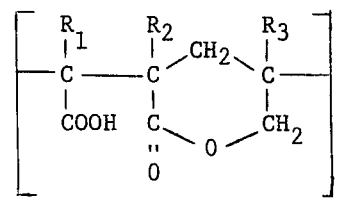

wherein $R_1$ and $R_2$ are the same or different and are selected from the group consisting of hydrogen, methyl, chlorine and bromine and $R_3$ is hydrogen or methyl, said polymer being produced by the process which consists of copolymerizing a first monomer of the formula

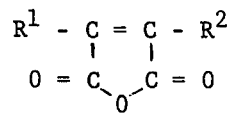

wherein $R_1$ and $R_2$ are as aforesaid with a second monomer of the formula

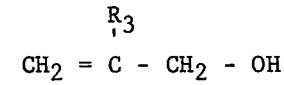

wherein $R_3$ is as aforesaid in equimolar amounts at a temperature between 20° and 200°C.

* * * * *